(12) United States Patent
Desrosiers

(10) Patent No.: US 10,218,225 B2
(45) Date of Patent: Feb. 26, 2019

(54) WIRELESS POWER TRANSFER GATE-DRIVE POWER REDUCTION

(71) Applicant: Broadcom Corporation, Irvine, CA (US)

(72) Inventor: Ryan Michael Desrosiers, Fort Collins, CO (US)

(73) Assignee: Avago Technologies International Sales PTE, Limited, Singapore (SG)

( * ) Notice: Subject to any disclaimer, the term of this patent is extended or adjusted under 35 U.S.C. 154(b) by 262 days.

(21) Appl. No.: 15/233,859

(22) Filed: Aug. 10, 2016

(65) Prior Publication Data

US 2017/0098962 A1 Apr. 6, 2017

Related U.S. Application Data

(60) Provisional application No. 62/236,822, filed on Oct. 2, 2015.

(51) Int. Cl.
| | |
|---|---|
| *H01F 27/42* | (2006.01) |
| *H02J 50/12* | (2016.01) |
| *H02M 3/158* | (2006.01) |
| *H02M 1/08* | (2006.01) |
| *H02J 7/02* | (2016.01) |
| *H02M 3/335* | (2006.01) |
| *H02M 1/36* | (2007.01) |
| *H02M 1/00* | (2006.01) |

(52) U.S. Cl.
CPC .............. *H02J 50/12* (2016.02); *H02J 7/025* (2013.01); *H02M 1/08* (2013.01); *H02M 3/158* (2013.01); *H02M 3/33592* (2013.01); *H02M 1/36* (2013.01); *H02M 2001/0006* (2013.01); *H02M 2001/007* (2013.01); *H02M 2001/008* (2013.01); *H02M 2001/0045* (2013.01); *H02M 2001/0054* (2013.01); *H02M 2001/0058* (2013.01); *Y02B 70/1475* (2013.01); *Y02B 70/1491* (2013.01)

(58) Field of Classification Search
CPC .......... H02J 50/12; H02J 7/025; H02M 3/158; H02M 1/08; H02M 2001/0006; Y02B 70/1475; Y02B 70/1491
See application file for complete search history.

(56) References Cited

U.S. PATENT DOCUMENTS

2016/0261191 A1* 9/2016 Akram ................ H02M 3/1588
2016/0285279 A1* 9/2016 Mehas .................... H02M 7/23

* cited by examiner

*Primary Examiner* — Jared Fureman
*Assistant Examiner* — Duc M Pham
(74) *Attorney, Agent, or Firm* — Morgan, Lewis & Bockius LLP

(57) ABSTRACT

A device and circuits are provided for wireless power transfer (WPT) gate-drive power reduction. A WPT receiver circuit includes a receive coil to couple to a transmit coil of a WPT transmitter circuit. A rectification circuit is coupled to the receive coil to generate a rectified voltage. The rectification circuit is a bridge rectifier circuit including a first set of field-effect transistors (FETs). One or more gate-drive control circuits improve power dissipation of the rectification circuit by controlling drive voltages of gate terminals of the first set of FET switches after start-up of the WPT receiver circuit.

20 Claims, 6 Drawing Sheets

WIRELESS POWER TRANSFER GATE-DRIVE POWER REDUCTION

CROSS-REFERENCE TO RELATED APPLICATIONS

This application claims the benefit of priority under 35 U.S.C. § 119 from U.S. Provisional Patent Application 62/236,822 filed Oct. 2, 2015, which is incorporated herein by reference in its entirety.

TECHNICAL FIELD

The present description relates generally to wireless charging, and more particularly, to wireless power transfer gate-drive power reduction.

BACKGROUND

Hand-held devices including wireless communication devices such as mobile phones, tablets, phablets, and personal digital assistant (PDA) are good candidates for using wireless power transfer (WPT) technology for battery charging. In WPT, energy is transferred from a power source to an electrical load without using an electrically conductive medium such as a wire for power transmission. Instead, the power transfer can take place wirelessly by using time-varying electric, magnetic, or electromagnetic fields. The wireless energy transfer is from a wireless power transmitter connected to power source to one or more wireless power receivers that receive the energy through an intervening space.

Common WPT technologies include magnetic resonance coupling, electromagnetic induction, and radiative power transfer. The magnetic resonance and electromagnetic induction solutions are used for short distances, whereas the radiative solution, also known as power beaming, is a far-field solution. The power beaming technique is mostly considered for use by solar power satellites and drones that receive electrical power from one or more beams of electromagnetic radiation such as microwave or laser. In the magnetic resonance coupling, the energy transfer is based on resonance between magnetic coils of the power transmitter and the power receiver devices. In the electromagnetic induction technique an inductive coupling between coils of the power transmitter and the power receiver devices is used for wireless power transmission. Both of the magnetic resonance coupling and electromagnetic induction techniques are based on high-frequency electromagnetic radiation in the range of a few hundred KHz to a few MHz.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without one or more of the specific details. In some instances, structures and components are shown in block diagram form in order to avoid obscuring the concepts of the subject technology.

In one or more aspects of the subject technology, a device and circuits are provided for wireless power transfer (WPT) gate-drive power reduction. The subject technology enables reducing power consumption in the rectification circuit of a WPT receiver by a number of techniques. In some aspects, the subject disclosure replaces a linear regulator following the rectification circuit with a more power efficient buck switching regulator (hereinafter "buck regulator"). The buck regulator is a switching regulator that down-converts a DC input voltage to a lower DC voltage of the same polarity using one or more transistor switches (e.g., field-effect transistor (FET) switches) that connect and disconnect the input voltage to an inductor.

In one or more aspects, the subject technology applies a more efficient power source and a lower voltage source for the gate-drive circuits of the rectification circuit and the buck regulator after the system starts up. For example, the battery voltage or the buck regulator output can be used rather than the rectified voltage (e.g., Vrect supply rail). In other aspects, the number of field-effect transistor (FET) fingers of the rectification circuit and the buck regulator can be scaled. In some embodiments, the operating frequency of the buck regulator can be changed (e.g., reduced) to improve power efficiency of the buck regulator.

Figure 1A:
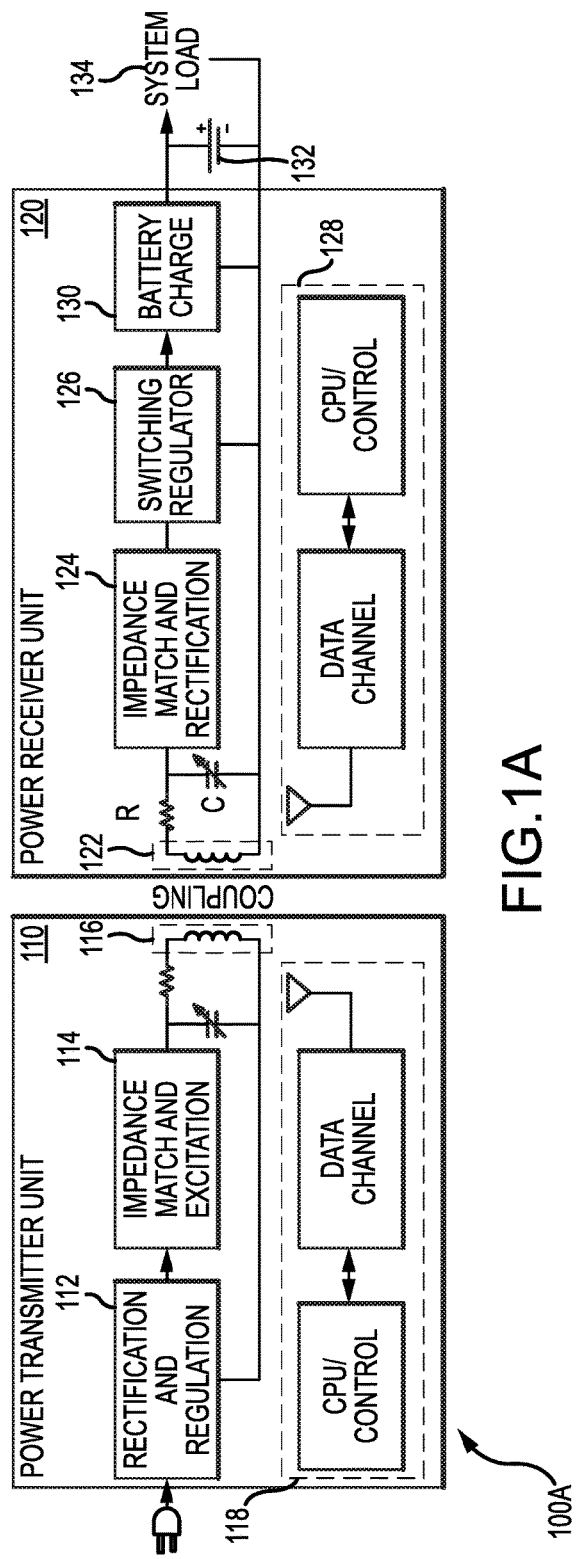
FIGS. 1A-1B are block diagrams illustrating examples of a wireless power transfer (WPT) circuit and a corresponding rectification circuit.
Figure 1B:
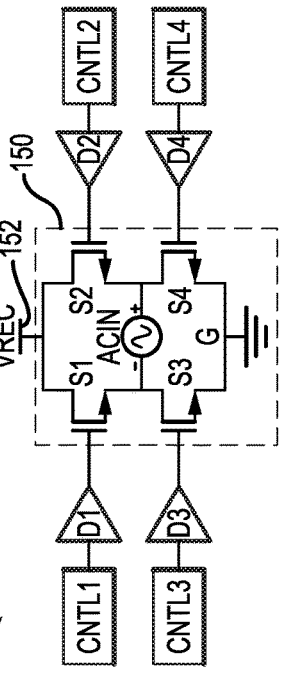

FIGS. 1A-1B are block diagrams illustrating examples of a wireless power transfer (WPT) circuit 100A and a corresponding rectification circuit 100B. The WPT circuit 100A of FIG. 1A includes a WPT transmitter 110 and a WPT receiver 120. The WPT transmitter 110 includes a rectification and regulation circuit 112, an impedance match and excitation circuit 114 a transmit coil 116, and a communication channel 118. The WPT receiver 120 includes a receive coil 122, an impedance match and rectification circuit 124, a switching regulator 126, a communication channel 128, a battery charger 130, and one or more batteries 132.

The WPT transmitter 110 receives AC (e.g., 110-120 V or 220-240 V) input power from a power line and uses the input power to excite the transmit coil 116 (e.g., via 114) by providing a time varying magnetic field in the transmit coil 116. The receive coil 122 can couple to the magnetic field generated by the transmit coil 116 to receive power from the WPT transmitter 110. The magnetic coupling of the transmit coil 116 and the receive coil 122 depends, among other factors, on the physical distance of these coils. For example, if the distance is too far for the magnetic coupling to induce a desired power level in the WPT receiver 120, the communication channel 128 may communicate a signal to the communication channel 118 of the WPT transmitter 110 to alert the WPT transmitter 110. In response, the WPT transmitter 110 can either increase the excitement current of the transmit coil 116, or if that is not possible, inform the WPT receiver 120 by sending a signal back to alert a user of the WPT receiver 120 to take a suitable action. The communication channels 118 and 128 can be used for other signal exchanges between the WPT transmitter 110 and the WPT receiver 120.

The subject technology is directed to reducing the power consumption of the rectification circuit of the impedance matching and rectification circuit 124. Accordingly, the detailed description of all blocks of the WPT circuit 100A is not in the scope of the current disclosure and will be skipped for the sake of brevity. It is understood that the impedance matching and rectification circuit 124 includes one or more sub-circuits that provide a matching impedance to the preceding circuit formed by the receive coil 122, a resistor R and a variable capacitor C. The variable capacitor C may be used to adjust the magnetic coupling and/or the impedance matching. The impedance matching and rectification circuit 124 also provides rectification of an AC input voltage provided by the magnetic coupling of the receive coil 122 to the transmit coil 116. The rectified voltage at the output of the impedance matching and rectification circuit 124 can have a wide range of variation (e.g., 3V-20V). The switching regulator 126 conditions (e.g., adjusts) the rectified voltage and converts it to a stable DC voltage (e.g., 5V) for the battery charger 130 to charge the battery 132 and to provide a system DC output voltage 134. In one or more aspects, the switching regulator 126 is a buck regulator. The buck regulator is a switching regulator that down-converts a DC input voltage to a lower DC voltage of the same polarity using one or more transistor switches (e.g., field-effect transistor (FET) switches) that connect and disconnect the input voltage to an inductor. It is noted that the current solution is not limited to WPT circuits that use magnetic coupling between the transmit and receive coils (e.g., 116 and 122) and its application can be readily extended to WPT circuits with different couplings, such as magnetic-resonance coupling, between the transmit and receive coils.

The rectification circuit 100B of FIG. 1B is a sub-circuit of the impedance matching and rectification circuit 124 and includes a full bridge circuit 150, driver circuits D1 through D4, and control circuits CNTL1 through CNTL4. The full bridge circuit 150 includes switching devices (e.g., transistors, such as FET switches) S1, S2, S3, and S4. The FET switches S1 through S4 can be switched on or off by voltages applied to their gate terminals. The gate terminal voltages are provided by the driver circuits D1 through D4 and are controlled by the control circuits CNTL1 through CNTL4. In operation, the FET switches S1 and S4 are controlled to be on in, for example, a first (e.g., positive) half-cycle of the AC input voltage (ACin), and the FET switches S2 and S3 are controlled to be on in, for example, a second (e.g., negative) half-cycle of the AC input voltage. Thus, during the positive cycle of the AC input voltage, FET switches S1 and S4 conduct current from a node G at the ground potential to a node 152, which maintains a DC voltage Vrec (e.g., nearly equal to an amplitude of the AC input voltage) at the node 152. Similarly, during the negative cycle of the AC input voltage, FET switches S2 and S3 conduct current from the node G to the node 152, which again maintains substantially the same DC voltage (e.g., Vrec) at the node 152. As mentioned above, the DC voltage Vrec is not well regulated, as the amplitude of the AC input voltage can vary depending on the distance between transmit coil 116 and the receive coil 122.

One of the objectives of the subject technology is to improve power efficiency of the WPT circuit 100A by reducing power consumption of the rectification circuit 100B. The power consumption of the rectification circuit 100B can be reduced, for example, by reducing power dissipation (loss) by the FET switches S1 through S4, by controlling the gate-drive of these FET switches. The power loss of a FET switch has two major components, the first power loss is a resistive loss associated with on-resistance (Rds) of the FET switch and the second power loss is a parasitic loss associated with parasitic capacitances of the FET switch. The capacitive power loss is proportional to frequency (f) times $CV^2$, where C is the capacitance, V is the voltage across the capacitor, and f is the switching frequency. The subject technology enables reducing the power consumption of the FET switches by FET scaling (e.g., reducing capacitive loss) and/or by reducing the gate-drive voltage that in turn reduces overall power loss of the FET, as described in more details herein. In one or more aspects, the power dissipation of the FET can be reduced by reducing the switching frequency that is controlled by the control circuits (e.g., CNTL1 . . . CNTL4).

Figure 2:
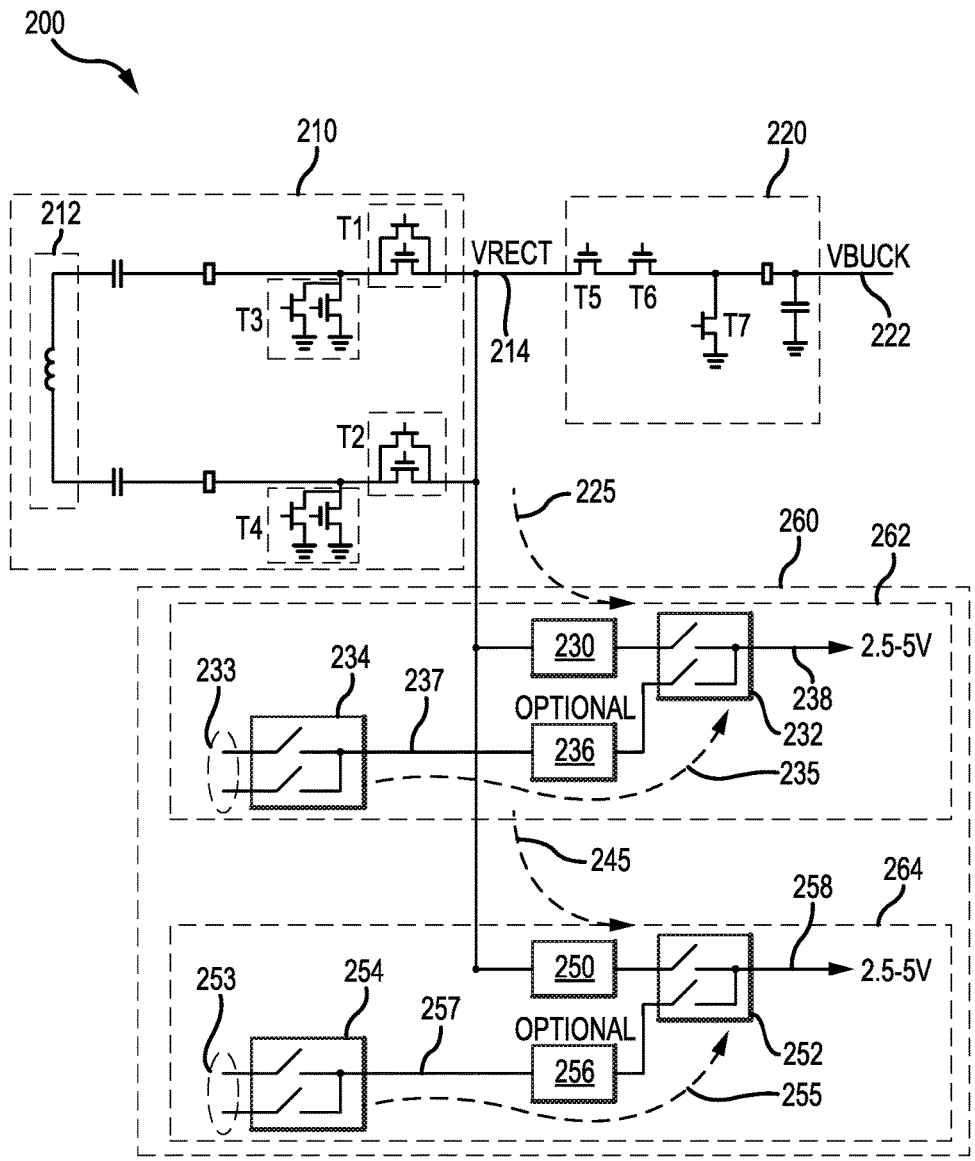
FIG. 2 is a schematic diagram illustrating an example of a circuit for gate-drive power reduction according to aspects of the subject technology.

FIG. 2 is a schematic diagram illustrating an example of a circuit 200 for gate-drive power reduction according to aspects of the subject technology. The circuit 200 includes a rectification circuit 210 followed by a buck regulator 220 and a control-and-driver circuitry 260. The rectification circuit 210 includes a receive coil 212 that can be coupled to a transmit coil (e.g., 116 of FIG. 1A) of a WPT transmitter (e.g., 110 of FIG. 1A). The rectification circuit 210 further includes a first set of FET switches T1, T2, T3, and T4 that are similar to FET switches S1, S2, S3, and S4 of FIG. 1B. The rectification circuit 210 provides a rectified voltage (Vrect) at an output node 214. The subject technology provides suitable gate-drive voltages for the first set of FET switches T1, T2, T3, and T4 after system (e.g., a system using a WPT circuit such as 100A of FIG. 1A) start-up, which, for the purpose of the present disclosure, is not different from the start-up of the WPT circuit 100A and hereinafter is referred to as "system start-up".

The buck regulator 220 conditions the Vrect generated at the output node 214 of the rectification circuit 210 and provides a DC output voltage (Vbuck) at an output node 222 of the buck regulator 220. The buck regulator 220 includes a second set of FET switches T5, T6 and T7, which are to be controlled through respective gate voltages. The subject technology provides suitable gate-drive voltages for the second set of FET switches T5, T6, and T7 after the system start-up. In one or more aspects, the control-and-driver circuitry 260 provides suitable gate-drive voltage for the FET switches of the rectification circuit 210 and buck regulator 220, as described below. It should be noted that, the existing art uses a linear regulator after the rectification circuit 210. Using the buck regulator 220 after the rectification circuit 210 is an advantageous feature of the subject disclosure, which results in significant power efficiency improvement as explained below.

The control-and-driver circuitry 260 is an example implementation of the combination of the driver circuits D1 through D4 and CONTL1 through CONTL4 of FIG. 1B. In one or more implementations, the control-and-driver circuitry 260 includes sub-circuitry 262 and 264. The sub-circuitry 262 receives one or more input voltages from a first set of inputs 233 and generates a gate-drive voltage at nodes 238 for the gates of the FET switches of the rectification circuit 210, after the system start-up. The sub-circuitry 264 receives one or more input voltages from a second set of inputs 253 and generates a gate-drive voltage at nodes 258 for the gates of the FET switches of the buck regulator 220, after the system start-up.

In one or more aspects, the sub-circuitry 262 includes two paths and each path runs through a number of circuits. A path 225 is a path used during the system start-up and runs through a linear regulator 230 and a switch 232. A path 235 is used after the system start-up and runs through a multi-input switch 234, an optional low-dropout (LDO) regulator 236, and the switch 232. Both paths 225 and 235 end in the same node 238 and provide gate-drive voltage (e.g., 2.5-5V) for the first set of FET switches T1, T2, T3, and T4. In one or more implementations, the linear regulator 230 is a known circuit and receives rectified voltage Vrect and provides a coarsely adjusted voltage. The switch 232 can be controlled to close one of the paths 225 or 235. During the system start-up, the switch 232 closes path 225, thus allowing the output voltage of the linear regulator 230 (e.g., the coarsely adjusted voltage) to appear at the node 238. The multi-input switch 234 can selectively connect one of a set of inputs 233 to a node 237. In one or more implementations, the switch 232 and the multi-switch 234 are implemented by transistors (e.g., FET switches) and can be controlled by a processor, such as microcontroller of a host device. The optional LDO regulator 236 is a known circuit that can provide further conditioning of the voltage at node 237. After the system start-up, the switch 232 allows closing of the path 235 and thus the voltage at node 237 appears at the node 238, to be applied as gate-drive voltage for the FET switches of the rectification circuit 210. In one or more aspects, the set of inputs 233 includes a battery voltage (Vbat), a buck regulator voltage (Vbuck), the rectified voltage (Vrect), or a system voltage (Vsys). The system voltage can be a voltage drawn from a voltage rail of a host system or device.

In some aspects, the sub-circuitry 264 includes paths 245 and 255, each path running through a number of circuits. The path 245 is used during the system start-up and runs through a linear regulator 250 and a switch 252. The path 255 is used after the system start-up and runs through a multi-input switch 254, an optional low-dropout (LDO) regulator 256 and the switch 252. Both paths 245 and 255 end in the same node 258 and provide gate-drive voltage (e.g., 2.5-5V) for the second set of FET switches T5, T6, and T7. In one or more implementations, the linear regulator 250 is similar to the linear regulator 230 and receives rectified voltage, Vrect, and provides a coarsely adjusted voltage. The switch 252 is similar to switch 232 and can be controlled to close on of the paths 245 or 255. During the system start-up, the switch 252 closes path 245, thus allowing the output voltage of the linear regulator 250 (e.g., the coarsely adjusted voltage) to appear at the node 258. The multi-input switch 254 can selectively connect one of a set of inputs 253 to a node 257. In one or more implementations, the switch 252 and the multi-switch 254 are implemented by transistors (e.g., FET switches) and can be controlled by a processor, such as microcontroller of a host device. The optional LDO regulator 256 is similar to the LDO regulator 236 and can provide further conditioning of the voltage at node 257.

After the system start-up, the switch 252 allows closing of the path 255 and thus the voltage at node 257 appears at the node 258, to be applied as gate-drive voltage for the FET switches of the buck regulator 220. In one or more aspects, the set of inputs 253 includes Vbat, Vbuck, Vrect, or Vsys.

It is understood that power consumption by linear regulators 230 and 250 can be significant, as they are not desirably efficient, thus can adversely affect the power consumption of the rectification circuit. The subject technology reduces power consumption by allowing bypassing of the linear regulators 230 and 250 after the system start-up and providing gate-drive voltages for the FET switches of the rectification circuit 210 and the buck regulator 220 from a number sources (e.g., Vbat, Vbuck, Vrect, or the Vsys) without the use of the linear regulators 230 and 250. The power losses of a rectification circuit are mostly from resistive and capacitive losses. The resistive losses are associated with drain-source on-resistance ($R_{on}$) of the FET switches (e.g., T1 through T4) and can be expressed as: $P_r = (I_{rms})^2 \cdot R_{on}$, where $I_{rms} = (1.1) \cdot I_{dc}$ for the sinusoidal currents and "·" Represents multiplication operation (x). The capacitive loses are associated with gate capacitance (Cg) of the FET switches and can be expressed as: $P_c = C_g \cdot (V_g)^2 \cdot f$, where Vg is the gate-drive voltage and f is the switching frequency.

For an example rectification circuit (e.g., 210) operating at a switching frequency of approximately 6.78 MHz and at an approximate DC current value of $I_{dc} = 1$ A, typical respective approximate values of on-resistance and gate capacitance can be $R_{on} = 80$ mΩ, and Cg=270 pF. When applying an approximately 5V gate-drive voltage, for 2 FET switches (e.g., T1 and T4 or T2 and T3) that are on at any given time, an approximate resistive loss is: $P_r = 2 \times (1.1 \times 1)^2 \times 80 = 193$ mW, and the approximate value for capacitive loss for the 4 FET switches is: $P_c = 4 \times 270 \times (5)^2 \times 6.78 = 183$ mW. This results in an approximate value for the total power loss of: $P_{loss} = 193 + 183 = 376$ mW. The rectification circuit power efficiency ($E_{ffp}$) can be expressed as: $E_{ffp} = P_{out}/(P_{out} + P_{loss})$. Substituting approximate values for $V_{out} = 5V$ and $I_{dc} = 1$ A, results in an approximate value of $P_{out} = 5 \times 1 = 5$ W and an approximate value for $E_{ffp} = 5$ W/(5 W+0.376 W)=0.93=93% for the power efficiency. As can be seen from the above example calculations, the resistive loss ($P_r$) is independent of switching frequency (f) and can be reduced by reducing Ron. The capacitive loss ($P_c$) is proportional to the switching frequency (f) and can be proportionately reduced by decreasing the switching frequency or by reducing the gate drive voltage Vg.

In the above example, the 183 mw for the approximate value of the capacitive loss for the gate-drive voltage was based on applied voltage V of ~5V, which corresponds to an approximate current value of 37 mA. In accordance with some aspects of the subject technology the the applied gate voltage V of ~5V can be drawn from the buck regulator output ($V_{buck}$) after the startup. It is well understood that the buck regulators operate at efficiencies in excess of 90%, while linear regulators efficiency is fixed at Vout/Vin which, in the present example, is 50% for the Vin (e.g., Vrect) of 10V and Vout of 5V. The existing solution uses the linear regulator 230 that is fed from the Vrect (~10V) after the system start-up. Using the approximate values of 37 mA and 10V for the current and voltage results in an approximate value of 370 mW for the capacitive loss, which is two times higher than the value of 183 mw obtained for the subject technology. Using similar calculations, it can be shown that using $V_{bat}$ with an approximate value of 3.8V instead of the applied voltage V ~5V can result in reducing the total power loss ($P_{loss}$) by approximately 20%.

One approach of the subject technology for improving the power efficiency of the rectification circuit is to apply FET scaling by using finger FETs that allow controlling the number of parallel FET switches that are being used at any given time. Examples of finger FET switches are the FET switches T1 through T4 of the rectification circuit 210, which show two FET switches in parallel. In practice the counts of FETs of a finger FET can be more than two (e.g., 16). The FET switches of a finger FETs have common drain and source nodes, but their gate nodes are individually driven and controlled through separate drive circuits and control circuits. Using FET switching, the FET switches can be driven at full-drive or fractional-drive such as half-drive, or quarter-drive. For example, at full-drive with an approximate value of $V_{out}=V_{rect}=10V$, and for an approximate value of a 0.5 A load, approximate values for $P_{out}$, $P_r$, $P_c$, and $P_{loss}$ can be calculated as follows: $P_{out}=10 \times 0.5=5$ W, $P_r=2\times(1.1\times 0.5)^2 \times 80=48$ mW, $P_c=270\cdot(5)^2 \cdot 6.78=183$ mW, and $P_{loss}=48+183=231$ mW.

For a half-drive and the same values of $V_{out}$ (~10V) and load current (~0.5 A), approximate values for $P_{out}$, $P_r$, $P_c$, and $P_{loss}$ are as follows: $P_{out}=10 \times 0.5=5$ W, $P_r=4\times(1.1 \times 0.5)^2 \times 80=96$ mW, $P_c=(270/2)\cdot(5)^2 \cdot 6.78=91.5$ mW, and $P_{loss}=96+91.5=188$ mW, which when compared with the 231 mW value for the full-drive scenario shows a 20% improvement of power loss due to FET scaling. Further comparison results are shown and described below.

Figure 3:
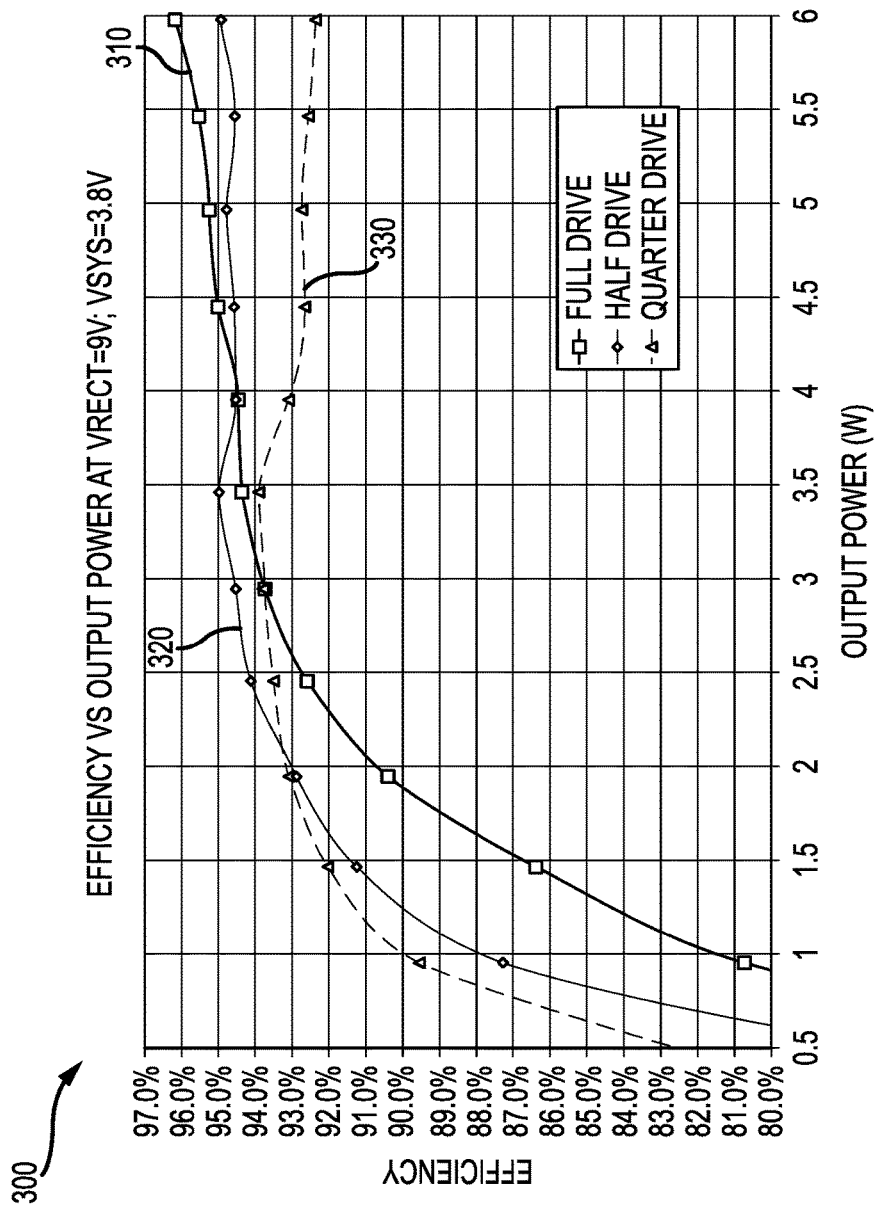
FIG. 3 is a diagram illustrating example plots of efficiency versus output power of a circuit for gate-drive power reduction according to aspects of the subject technology.

FIG. 3 is a diagram illustrating example plots 310, 320, and 330 of power efficiency versus output power of a circuit for gate-drive power reduction according to aspects of the subject technology. As explained above, the subject technology enables FET scaling that results in fractional-drive schemes such as half-drive, or quarter-drive for the FET switches of the rectification circuit 210 or the buck regulator 220. The plots 310, 320, and 330 show power efficiency ($E_{ffp}$) versus output power ($P_{out}$) for the full-drive (310), the half-drive (320), and the quarter-drive (330) schemes. As seen from these plots, the quarter-drive scheme results in more efficiency at output power levels below about 2 W, whereas between output power levels of about 2 W to about 4 W, the half-drive scheme is more power efficient, and above about 4 W the full-drive scheme takes over as the more power efficient drive scheme. It is noted that the result shown by plots 310, 320, and 330 are based on $V_{rect}=9V$ and $V_{sys}=3.8V$.

Figure 4A:
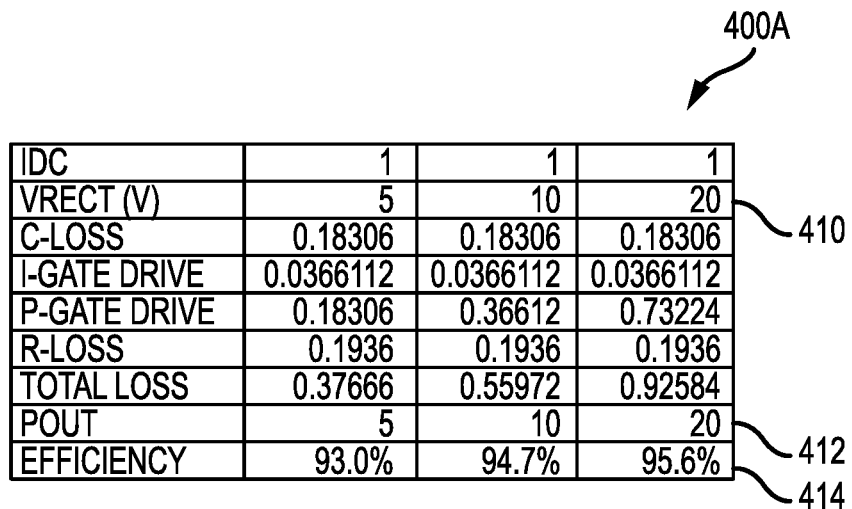
FIGS. 4A-4B are tables illustrating examples values of respective power losses and efficiencies for a linear regulator and a buck regulator according to aspects of the subject technology.
Figure 4B:
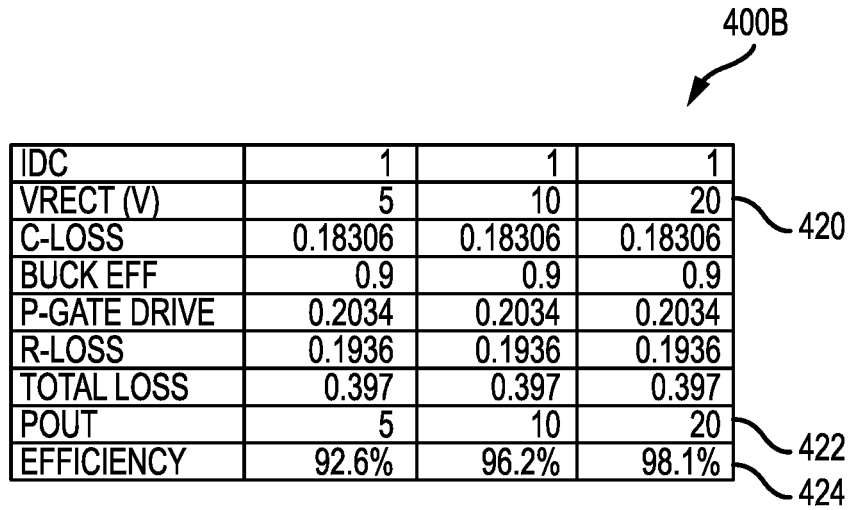

FIGS. 4A-4B are tables 400A and 400B illustrating examples values of respective power losses and efficiencies for a linear regulator and a buck regulator according to aspects of the subject technology. Table 400A of FIG. 4A shows various power losses and efficiencies for a typical linear regulator operating at a current of approximately 1 A, and a switching frequency of ~6.78 MHz, having FET switches with approximate values of $R_{on}$ and $C_g$ of 80 mΩ, and 270 pF. In particular lines 410, 412 and 414 show respective approximate values used for $V_{rect}$ (V) and calculated values for $P_{out}$ (W) and power efficiency ($E_{ffp}$). Similarly, Table 400B of FIG. 4B shows various power losses and efficiencies for a buck regulator operating at a current of approximately 1 A, and a switching frequency of ~6.78 MHz, having FET switches with approximate values of $R_{on}$ and $C_g$ of 80 mΩ and 270 pF. In particular lines 420, 422 and 424 show respective approximate values used for $V_{rect}$(V) and calculated values for $P_{out}$ (W) and power efficiency ($E_{ffp}$). A comparison of the results shown in Tables 400A and 400B indicate that the power efficiency can be improved by using a buck regulator (subject disclosure) instead of a linear regulator (existing art) particularly at high rectifier voltages where the linear regulator suffers from efficiency loss.

Figure 5:
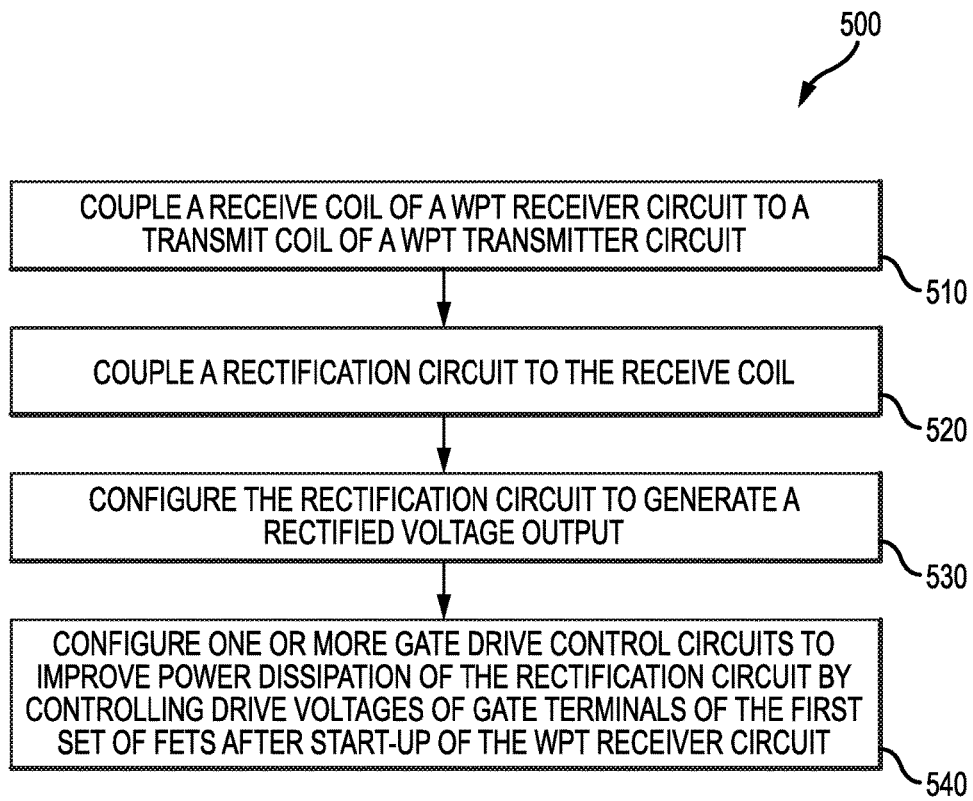
FIG. 5 is flow diagram illustrating a method for gate-drive power reduction according to aspects of the subject technology.

FIG. 5 is flow diagram illustrating a method 500 for gate-drive power reduction according to aspects of the subject technology. The method 500 starts with coupling a receive coil (122 of FIG. 1A) of a WPT receiver circuit (120 of FIG. 1A) to a transmit coil (116 of FIG. 1A) of a WPT transmitter circuit (110 of FIG. 1A) (510). The method 500 continues with coupling a rectification circuit (100B of FIG. 1B or 210 of FIG. 2) to the receive coil (520), and configuring the rectification circuit to generate a rectified voltage output (e.g., $V_{rect}$ of FIG. 2) (530). One or more gate-drive control circuits (e.g., 262 and 264 of FIG. 2) can improve power dissipation of the rectification circuit by controlling drive voltages of gate terminals of the first set of FET switches (e.g., T1 through T4 of FIG. 2) after start-up of the WPT receiver circuit (540).

Figure 6:
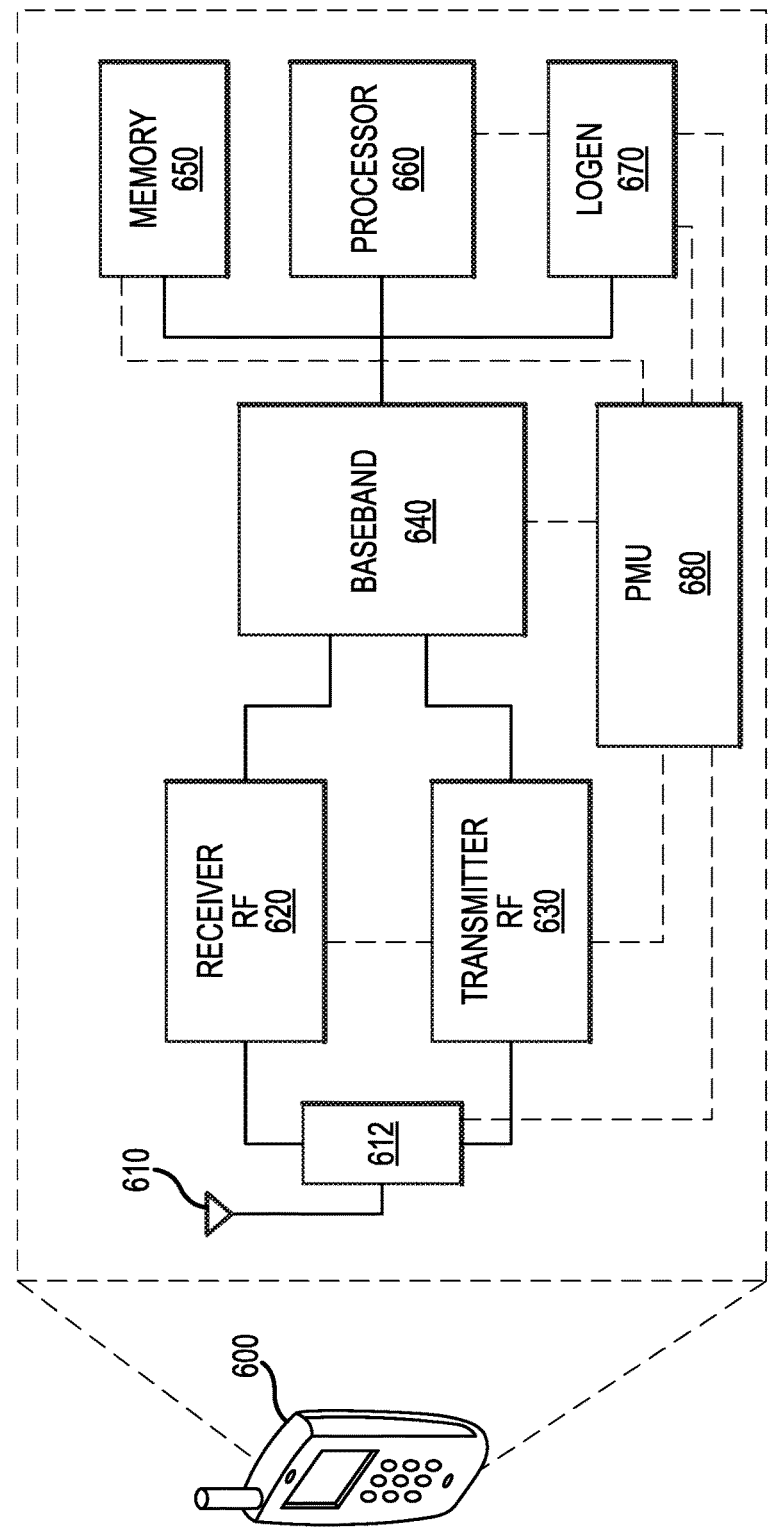
FIG. 6 is a block diagram illustrating an example wireless communication device in accordance with one or more implementations of the subject technology

FIG. 6 is a block diagram illustrating an example wireless communication device 600 in accordance with one or more implementations of the subject technology. The wireless communication device 600 may comprise a radio-frequency (RF) antenna 610, a receiver 620, a transmitter 630, a baseband processing module 640, a memory 650, a processor 660, a local oscillator generator (LOGEN) 670, and a power management unit (PMU) 680. In various embodiments of the subject technology, one or more of the blocks represented in FIG. 6 may be integrated on one or more semiconductor substrates. For example, the blocks 620-670 may be realized in a single chip or a single system on chip, or may be realized in a multi-chip chipset.

The RF antenna 610 may be suitable for transmitting and/or receiving RF signals (e.g., wireless signals) over a wide range of frequencies. Although a single RF antenna 610 is illustrated, the subject technology is not so limited.

The receiver 620 may comprise suitable logic circuitry and/or code that may be operable to receive and process signals from the RF antenna 610. The receiver 620 may, for example, be operable to amplify and/or down-covert received wireless signals. In various embodiments of the subject technology, the receiver 620 may be operable to cancel noise in received signals and may be linear over a wide range of frequencies. In this manner, the receiver 620 may be suitable for receiving signals in accordance with a variety of wireless standards. Wi-Fi, WiMAX, Bluetooth, and various cellular standards. In various embodiments of the subject technology, the receiver 620 may not require any SAW filters and few or no off-chip discrete components such as large capacitors and inductors.

The transmitter 630 may comprise suitable logic circuitry and/or code that may be operable to process and transmit signals from the RF antenna 610. The transmitter 630 may, for example, be operable to up-convert baseband signals to RF signals and amplify RF signals. In various embodiments of the subject technology, the transmitter 630 may be operable to up-convert and amplify baseband signals processed in accordance with a variety of wireless standards. Examples of such standards may include Wi-Fi, WiMAX, Bluetooth, and various cellular standards. In various embodiments of the subject technology, the transmitter 630 may be operable to provide signals for further amplification by one or more power amplifiers.

The duplexer 612 may provide isolation in the transmit band to avoid saturation of the receiver 620 or damaging parts of the receiver 620, and to relax one or more design requirements of the receiver 620. Furthermore, the duplexer 612 may attenuate the noise in the receive band. The duplexer may be operable in multiple frequency bands of various wireless standards.

The baseband processing module 640 may comprise suitable logic, circuitry, interfaces, and/or code that may be operable to perform processing of baseband signals. The baseband processing module 640 may, for example, analyze received signals and generate control and/or feedback signals for configuring various components of the wireless communication device 600 such as the receiver 620. The baseband processing module 640 may be operable to encode, decode, transcode, modulate, demodulate, encrypt, decrypt, scramble, descramble, and/or otherwise process data in accordance with one or more wireless standards.

The processor 660 may comprise suitable logic, circuitry, and/or code that may enable processing data and/or controlling operations of the wireless communication device 600. In this regard, the processor 660 may be enabled to provide control signals to various other portions of the wireless communication device 600. The processor 660 may also control transfers of data between various portions of the wireless communication device 600. Additionally, the processor 660 may enable implementation of an operating system or otherwise execute code to manage operations of the wireless communication device 600. In one or more aspects that processor 600 may control the operation (e.g., closing or opening of varies internal FET switches) of the switches 232, 252 and the multi-input switches 234 and 254 of FIG. 2.

The memory 650 may comprise suitable logic, circuitry, and/or code that may enable storage of various types of information such as received data, generated data, code, and/or configuration information. The memory 650 may comprise, for example, RAM, ROM, flash, and/or magnetic storage. In various embodiment of the subject technology, Information stored in the memory 650 may be utilized for configuring the receiver 620 and/or the baseband processing module 640.

The local oscillator generator (LOGEN) 670 may comprise suitable logic, circuitry, interfaces, and/or code that may be operable to generate one or more oscillating signals of one or more frequencies. The LOGEN 670 may be operable to generate digital and/or analog signals. In this manner, the LOGEN 670 may be operable to generate one or more clock signals and/or sinusoidal signals. Characteristics of the oscillating signals such as the frequency and duty cycle may be determined based on one or more control signals from, for example, the processor 660 and/or the baseband processing module 640.

In operation, the processor 660 may configure the various components of the wireless communication device 600 based on a wireless standard according to which it is desired to receive signals. Wireless signals may be received via the RF antenna 610 and amplified and down-converted by the receiver 620. The baseband processing module 640 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 650, and/or information affecting and/or enabling operation of the wireless communication device 600. The baseband processing module 640 may modulate, encode and perform other processing on audio, video, and/or control signals to be transmitted by the transmitter 630 in accordance to various wireless standards.

The PMU 680 includes a power supply that can provide power to all circuits and modules of the wireless communication device 600. The power supply can use a battery voltage or can generate a rectified and regulated voltage from the power line to support one or more voltage rails of the wireless communication device 600. In one or more aspects, the PMU 680 can include a WPT circuit such as the PWT circuit 100A of FIG. 1 and can use the subject technology to efficiently receive power from a WPT transmitter, for example by using the circuit 200 for gate-drive power reduction or by leveraging the FET scaling solution explained above to reduce power consumption of the FET switches of its rectifiers and/or use buck regulators instead of linear regulators as described above.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A wireless power transfer (WPT) receiver circuit, the circuit comprising:
   a receive coil configured to couple to a transmit coil of a WPT transmitter circuit;
   a rectification circuit coupled to the receive coil and configured to generate a rectified voltage, wherein the rectification circuit comprises a bridge rectifier circuit including a first set of field-effect transistor (FET) switches; and
   one or more gate-drive control circuits including a first and a second switch and configured to improve power dissipation of the rectification circuit by controlling drive voltages of gate terminals of the first set of FET switches after start-up of the WPT receiver circuit, wherein the first switch is configured to allow switching between start-up and after start-up gate-drive voltages.

2. The circuit of claim 1, further comprising a buck switching regulator configured to condition the rectified voltage, wherein the buck switching regulator comprises a second set of FET switches, and wherein the buck switching regulator is configured to operate at a reduced operating frequency.

3. The circuit of claim 2, wherein the one or more gate-drive control circuits are configured to control drive voltages of gate terminals of the second set of FET switches after start-up of the WPT receiver circuit.

4. The circuit of claim 2, wherein the first set of FET switches and the second set of FET switches comprise finger FETs that allow reducing a power loss of the rectification circuit by FET scaling.

5. The circuit of claim 4, wherein the FET scaling comprises a fractional-drive scheme including a half-drive scheme, and a quarter-drive scheme.

6. The circuit of claim 1, wherein the second switch comprises a multiple-input switch configured to enable applying one of a battery voltage, a buck regulator voltage, or the rectified voltage as the drive voltages of gate terminals of the first set of FET switches after the start-up of the WPT receiver circuit.

7. The circuit of claim 6, wherein the one or more gate-drive control circuits further comprise a low-drop-out (LDO) regulator configured to condition an output of the multiple-input switch.

8. The circuit of claim 1, wherein the receive coil is configured to electromagnetically couple to the transmit coil.

9. The circuit of claim 1, wherein the receive coil is configured to couple to the transmit coil via magnetic resonance coupling.

10. The circuit of claim 1, wherein the rectification circuit is further configured to provide a matching impedance to the receive coil and an RC circuit.

11. A wireless power transfer (WPT) receiver circuit, the circuit comprising:
    a receive coil configured to couple to a transmit coil of a WPT transmitter circuit;
    a rectification circuit coupled to the receive coil and configured to generate a rectified voltage, the rectification circuit comprising a bridge rectifier circuit including a first set of field-effect transistor (FET) switches;
    one or more gate-drive control circuits including a first switch and a second switch, wherein the first switch is configured to allow switching between start-up and after start-up gate-drive voltages; and
    a buck switching regulator configured to condition the rectified voltage, wherein:
    the buck switching regulator comprises a second set of FET switches, and
    the first set of FET switches and the second set of FET switches comprise finger FETs that allow reducing a power loss of the rectification circuit by FET scaling.

12. The circuit of claim 11, further comprising one or more gate-drive control circuits configured to improve power dissipation of the rectification circuit by controlling drive voltages of gate terminals of the first set of FET switches and the second set of FET switches after start-up of the WPT receiver circuit.

13. The circuit of claim 11, wherein the second switch comprises a multiple-input switch configured to enable applying one of a battery voltage, a buck regulator voltage, or the rectified voltage as the drive voltages of gate terminals of the FET switches after the start-up of the WPT receiver circuit.

14. The circuit of claim 11, wherein the one or more gate-drive control circuits further comprise a low-drop-out (LDO) regulator configured to condition an output of the multiple-input switch.

15. The circuit of claim 11, wherein the FET scaling comprises a fractional-drive scheme including a half-drive scheme, and a quarter-drive scheme.

16. The circuit of claim 11, wherein the receiver coil is configured to couple to the transmit coil by one of electromagnetic coupling or magnetic resonance coupling.

17. The circuit of claim 11, wherein the rectification circuit is further configured to provide a matching impedance to the receive coil and an RC circuit.

18. A wireless communication device comprising:
    a wireless power transfer (WPT) receiver configured to couple to a WPT transmitter, the WPT receiver comprising:
    a receive coil configured to couple to a transmit coil of the WPT transmitter;
    a rectification circuit coupled to the receive coil and configured to generate a rectified voltage, the rectification circuit including a first set of field-effect transistor (FET) switches;
    a buck switching regulator configured to condition the rectified voltage, the buck switching regulator including a second set of FET switches; and
    one or more gate-drive control circuits including a first switch and a second switch and configured to improve power dissipation of the WPT receiver by controlling drive voltages of gate terminals of the first set of FET switches and the second set of FET switches after start-up of the WPT receiver, and wherein the first switch is configured to allow switching between start-up and after start-up gate-drive voltages.

19. The wireless communication device of claim 18, wherein the second switch comprises a multiple-input switch configured to enable applying one of a battery voltage, a buck regulator voltage, or the rectified voltage as the drive voltages of gate terminals of the first set of FET switches and the second set FET switches after the start-up of the WPT receiver.

20. The circuit of claim 18, wherein the rectification circuit is further configured to provide a matching impedance to the receive coil and an RC circuit.

* * * * *